United States Patent [19]

Harrison et al.

[11] Patent Number: 5,077,963
[45] Date of Patent: Jan. 7, 1992

[54] VINE CROP HARVESTER

[75] Inventors: E. James Harrison; Shawn Harrison, both of townsend, Va.

[73] Assignee: Harrison Harvester Company, Easton, Md.

[21] Appl. No.: 520,822

[22] Filed: May 9, 1990

[51] Int. Cl.[5] ............................................. A01D 45/00
[52] U.S. Cl. ................................... 56/327.1; 209/668
[58] Field of Search .............. 56/12.9, 327.1, DIG. 8; 209/620, 663, 668, 674

[56] References Cited

U.S. PATENT DOCUMENTS

| 3,347,031 | 10/1963 | De Long et al. | |
|---|---|---|---|
| 3,365,869 | 3/1965 | Whitely . | |
| 3,386,236 | 7/1965 | Mitchell . | |
| 3,387,611 | 3/1966 | Looker . | |
| 3,469,383 | 9/1969 | Manfre | 56/327.1 |
| 3,511,038 | 5/1970 | Gates et al. | 56/327.1 |
| 3,518,818 | 7/1970 | Porter | 56/327.1 |
| 3,521,710 | 7/1970 | Tillotson | 56/327.1 X |
| 3,536,140 | 10/1970 | Looker | 56/327.1 X |
| 3,916,913 | 11/1975 | Looker et al. | 56/327.1 X |

FOREIGN PATENT DOCUMENTS

| 3027651 | 3/1982 | Fed. Rep. of Germany | 209/668 |
|---|---|---|---|
| 1069673 | 1/1984 | U.S.S.R. | 56/327.1 |
| 2132116 | 7/1984 | United Kingdom | 209/668 |

OTHER PUBLICATIONS

"Pickle Picker: Men Hope It's A Ride to Riches", Stapleton, *Virginian Pilot*, Apr. 19, 1989 (2 pages).
"Harvester's Debut May Assist Farmers Who Are in a Pickle" Appleman, H., *The Richmond News Leader*, Apr. 4, 1989 (1 page).
"An Entrepreneur Brings A Revolution to Pickle Picking" Applemen, H., *The Washington Post*, Apr. 17, 1989 (1 page).
"Cucumbers: New Invention Picks 'Em Fast", Regan, E., *Virginian Pilot*, Oct. 8, 1987 (1 page).

*Primary Examiner*—William P. Neuder
*Attorney, Agent, or Firm*—Kerkam, Stowell, Kondracki & Clarke

[57] ABSTRACT

A vine crop harvester having improved harvesting features for reducing damage to the vine crop and increasing the efficiency of the harvester is provided, wherein a harvesting apparatus attached to a tractor has a digger chain employed to carry the vine crop upwardly from the ground to a pinch roller subassembly, the digger chain forming a shallow angle with the ground surface to reduce slippage on the belt to reduce abrasion and other damage to the crop being harvested. A digger blade is disposed adjacent the lower end of the digger chain, the blade having a base plate, a stainless steel cutting blade at an upper front surface thereof, and a PTFE layer fastened at an upper rear surface thereof, the spacing between the digger blade and the digger chain being adjustable and the angle of the digger blade being adjustable as well. Other features include the capability to adjust a distance between the upper end of the digger chain and the pinch rollers, proportional or independent control of moving parts of the harvesting assembly, the provision of a blower to create an air curtain blowing upwardly at the pinch roller subassembly, a boom conveyor extending transversely to the harvester assembly, and optionally a split digger chain wherein an upper and a lower chain may be spaced apart at a desired distance.

24 Claims, 8 Drawing Sheets

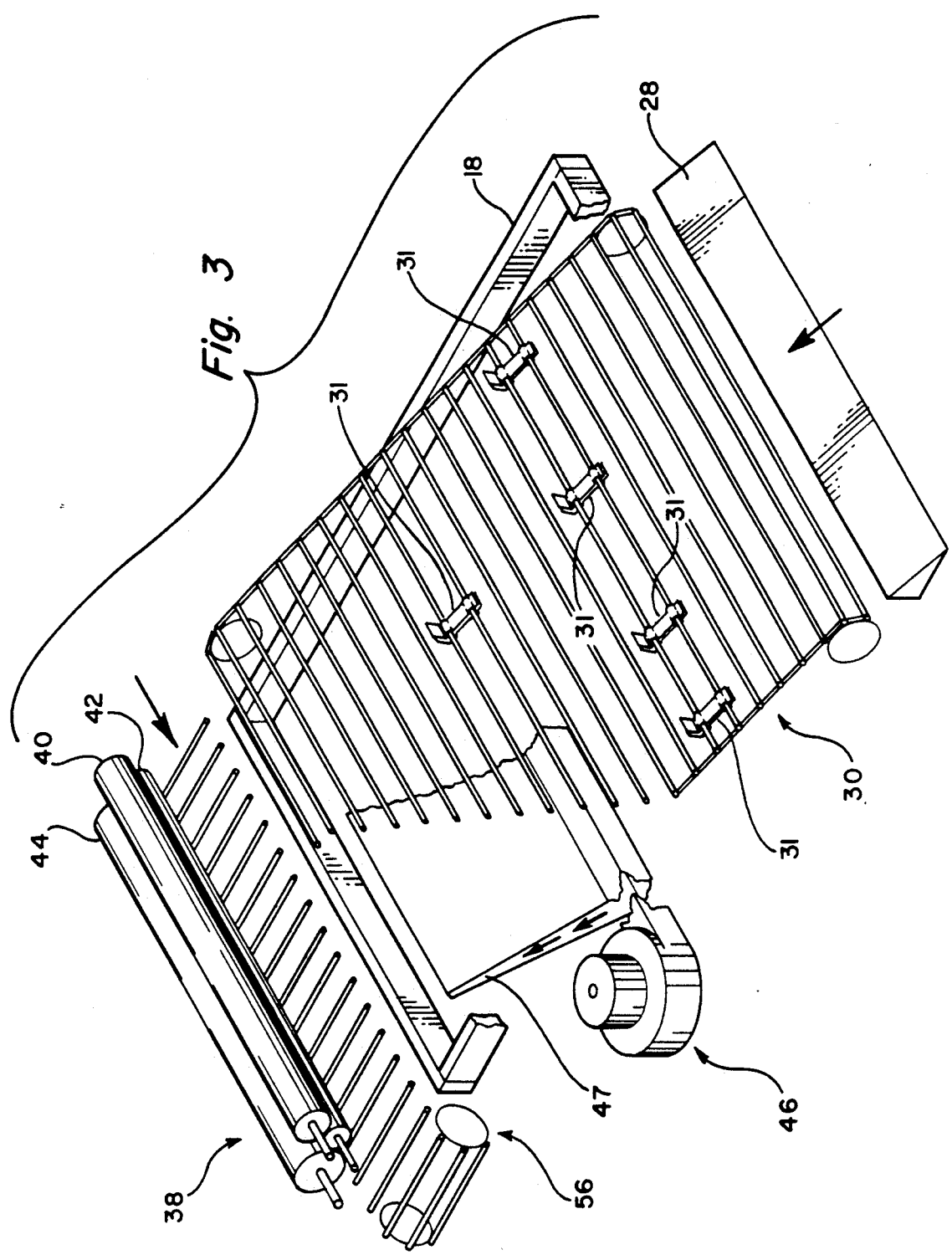

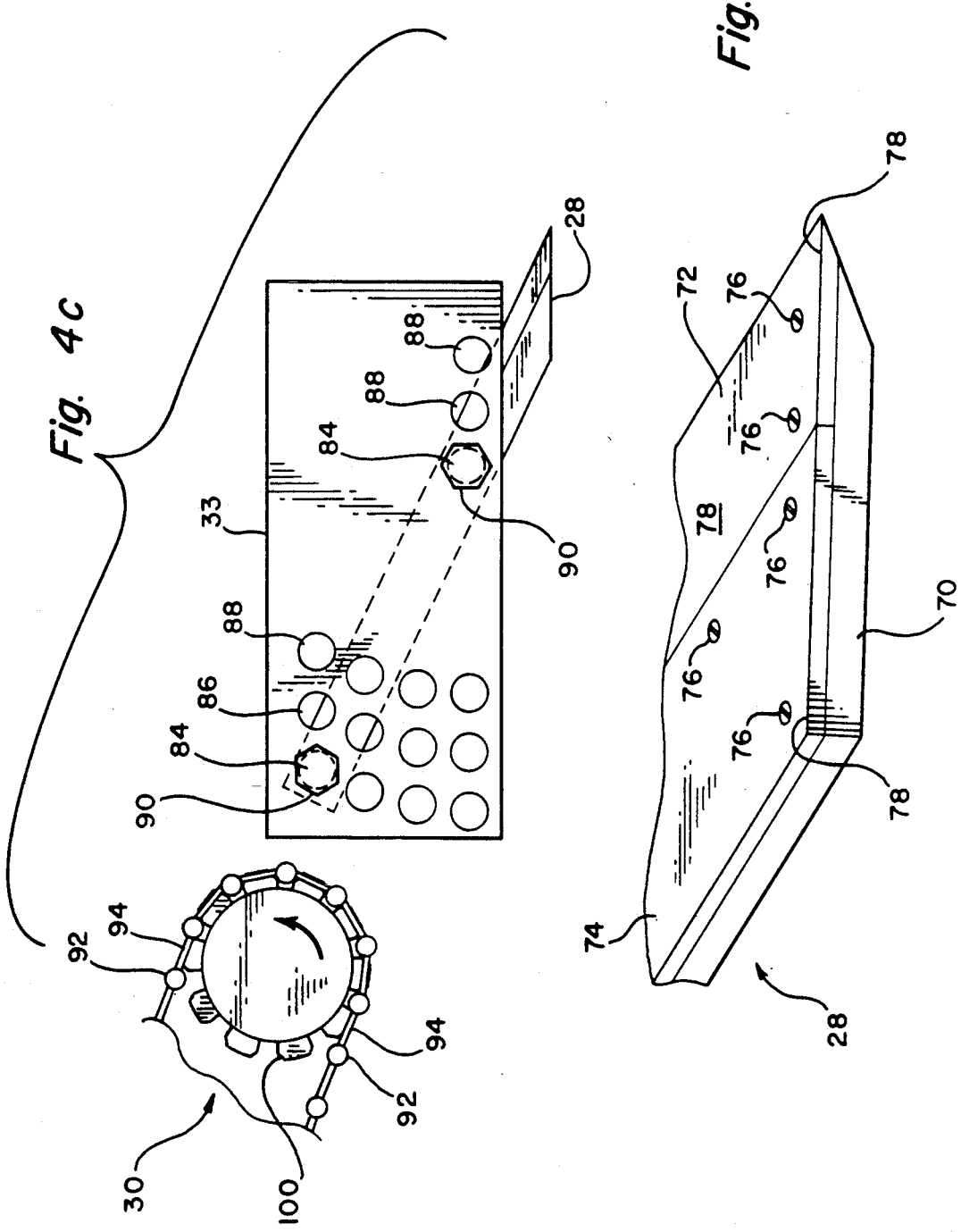

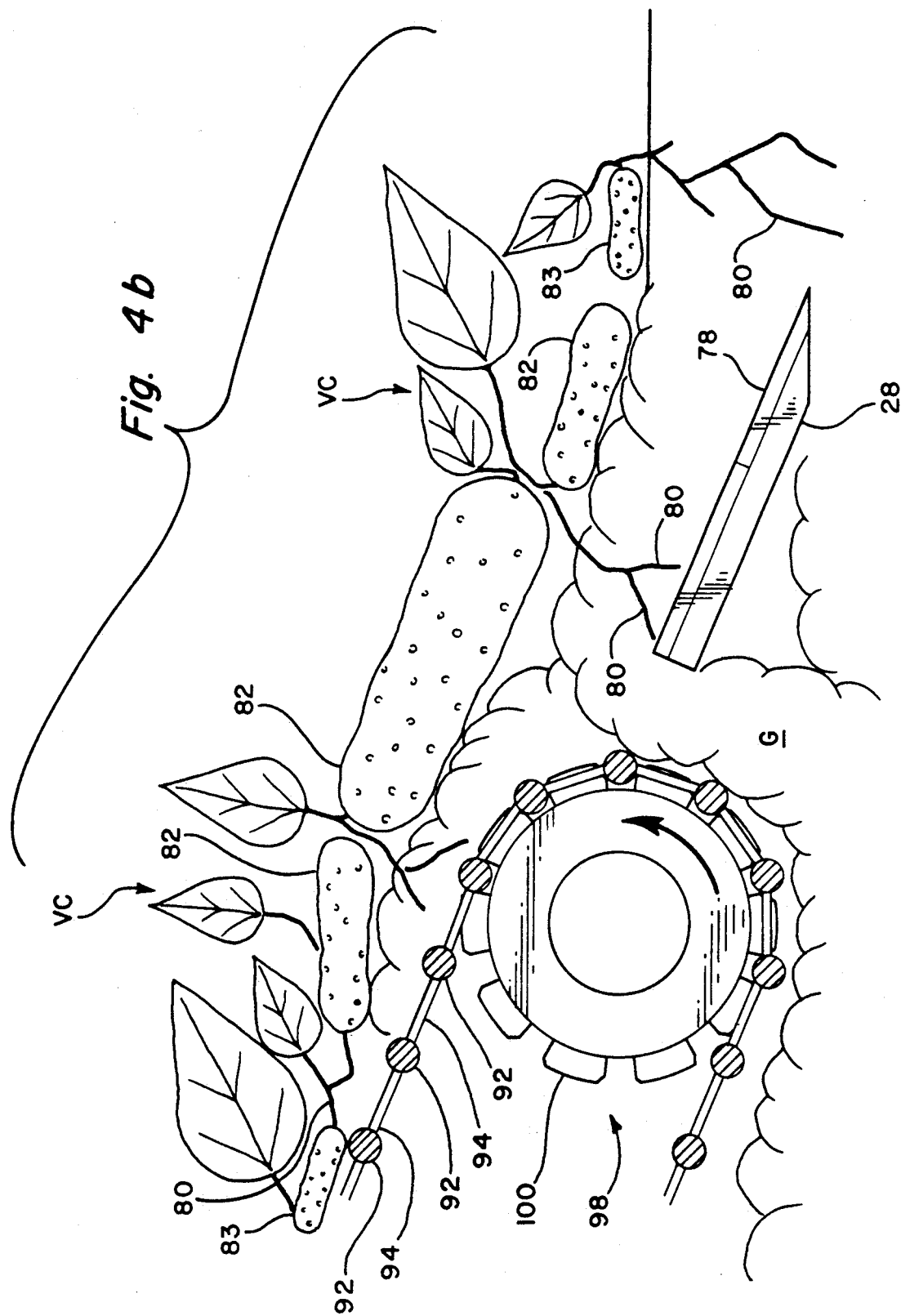

VINE CROP HARVESTER

BACKGROUND OF THE INVENTION

1. Field of the Invention

The present invention relates to a harvester apparatus and particularly to a harvester for vine growing crops such as cucumbers.

2. Description of Related Art

Heretofore, various embodiments of harvesting equipment for harvesting cucumbers and the like have been proposed with the purpose of reducing or eliminating the manual labor involved in the harvesting. Examples of such harvesters may be found in the following U.S. Pat. Nos. 3,347,031; No. 3,387,611; No. 3,916,913; No. Re. 27,715; No. 3,457,711; No. 3,427,794; No. 3,386,236; No. 3,365,869; No. 3,600,882; and No. 3,416,298.

While the harvesters disclosed in the above patents were directed to solving particular problems associated with the harvesting of cucumbers, it is believed that none of those, nor any other harvester design has been successfully employed on a wide-scale commercial harvesting basis, without suffering from one or more drawbacks. A major problem encountered in the mechanical harvesting of cucumbers is that transporting the cucumbers and separating the cucumbers from the vine on which they are grown have commonly caused the cucumbers to be damaged, either by bruising or abrading. In addition, removal and disposal of the vine material once the cucumbers have been removed therefrom is another problem which prior harvesters have attempted to solve.

Another problem encountered in the art, apparently going unsolved until the design of the harvester of the present invention, is that the cucumbers harvested may be found in either a dense "canopy" or in more sparse crop conditions, and the condition of the soil in which the cucumber vines are grown may vary to a wide extent. In addition, while some harvester devices have been designed to take into account the varying sizes of the cucumbers being harvested, none of the designs appear to provide the ability to optimize the operation of the harvester when harvesting primarily large cucumbers and/or when the harvester is used to harvest vines bearing primarily, if not exclusively, smaller "pickle" cucumbers.

All harvesters previously employed in the art have also used a short, steep belt to take up the vine and cucumbers. Slippage of the cucumbers downwardly due to the steep incline was commonly experienced which resulted in bruising and or abrading of the cucumbers thereby rendering damaged harvested products, reducing the yield of salable crop.

It is therefore a principal object of the present invention to provide a vine crop harvester which overcomes the problems identified with respect to the bruising or abrading of the crop in the process of removing the crop from the ground, separating the crop from the vine, and transporting the crop to a storage location.

It is another important object of the present invention to provide a vine crop harvester which has the ability to optimize operation of the harvester based on varying crop densities, varying crop sizes and varying soil conditions.

SUMMARY OF THE INVENTION

The above and other objects of the present invention are realized by providing a harvesting apparatus which incorporates numerous improvements and features for the purpose of increasing the yield of undamaged cucumbers and pickles, and maximizing the rate at which cucumbers may be harvested for various soil and vine growth conditions.

The harvester is self-propelled, in the sense that it is powered from the rear of the harvesting assembly by a tractor or other power means, which permits the operator to view the harvesting operation while facing forward in the direction of travel of the harvester, and at the same time eliminates the potential for damage to the cucumbers by the tractor tires, which is a drawback experienced in pull-type harvesters.

A digger blade and digger chain are provided on the harvesting assembly for moving the vines and cucumbers attached thereto upwardly away from the ground and advancing them toward a pinch roll subassembly which is designed to separate the cucumbers and/or pickles (small cucumbers) from the vines. The digger blade is provided with means for adjusting the angle of attack presented when moving through the soil, as well as with means for adjusting the distance between the digger blade and the digger chain for varying soil conditions. An upper surface of the blade has a stainless steel cutting edge and is teflon coated at the rear, to provide a reduction in sliding resistance as the soil and vines pass over the digger blade. The endless belt-type digger chain is designed to have regularly spaced cross members which will carry the vines and cucumbers attached thereto up to the pinch roll assembly, while permitting dirt and loose debris such as leaves, to fall through the chain back to the ground.

An extended length digger chain is employed in order to provide a less steep incline up which the cucumbers and vines are pulled. Less slippage of the cucumbers is experienced which has the benefit that the bruising and/or abrading due to such slippage is greatly reduced. The chain may also comprise two chain belts of this type having a gap between the belts to allow additional dirt and debris to be removed from the cucumber laden vine prior to the separation of the cucumbers from the vine.

A pinch or snap roller subassembly is provided adjacent to an upper end of the digger chain, and a gap between the chain and subassembly, termed herein a throat opening, may be adjusted as appropriate, by moving the pinch roller subassembly closer to or further away from the upper end of the digger chain, to be compatible with the size of the cucumbers on the vines being harvested. The discharge throat is also larger than those previously employed in the art, which improves the ability to harvest large volumes of cucumbers while operating the harvester at slower speeds, resulting in less damage to the cucumbers.

An air system or blower system is provided on the harvesting assembly to blow air upwardly into the vines as the vines leave the digger chain belt and are pulled into the snap roller assembly. The blower is designed to create an air curtain which assists in advancing or "throwing" the vines and cucumbers to the nip of the pinch rollers as well as assisting in removing dirt, leaves, and vines from amongst the cucumbers after they are snapped off the vine.

Another feature of the harvester of the present invention is the provision of a hydraulic system which has the capability to provide proportional control of all moving parts of the harvester, including the propulsion of the tractor. Generally, the desired speeds of the moving parts will be dependent upon the soil and crop conditions, for example, whether a dense "canopy" or a sparse crop of cucumbers is being harvested. In this system, the digger or pickup chain and the pinch (snap) rollers can be independently controlled as well to ensure a smooth and consistent feeding of the vines to the pinch rollers. A cross conveyor, which receives and transports the cucumbers and pickles as they are snapped off the vine may also be sped up or slowed down, depending on the density of the cucumber crop harvested.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment of the invention taken in conjunction with the accompanying drawings wherein like reference characters represent like parts throughout the views.

FIG. 3 is a front, partially cutaway, perspective view, in substantially schematic form, of the harvesting assembly of the present invention.

FIG. 4A a partial perspective view of the digger blade according to a preferred embodiment of the present invention.

FIGS. 4B,C are side elevation views of the digger blade and lower end of the digger chain of the present invention.

DETAILED DESCRIPTION OF THE PREFERRED EMBODIMENT

Figure 1:
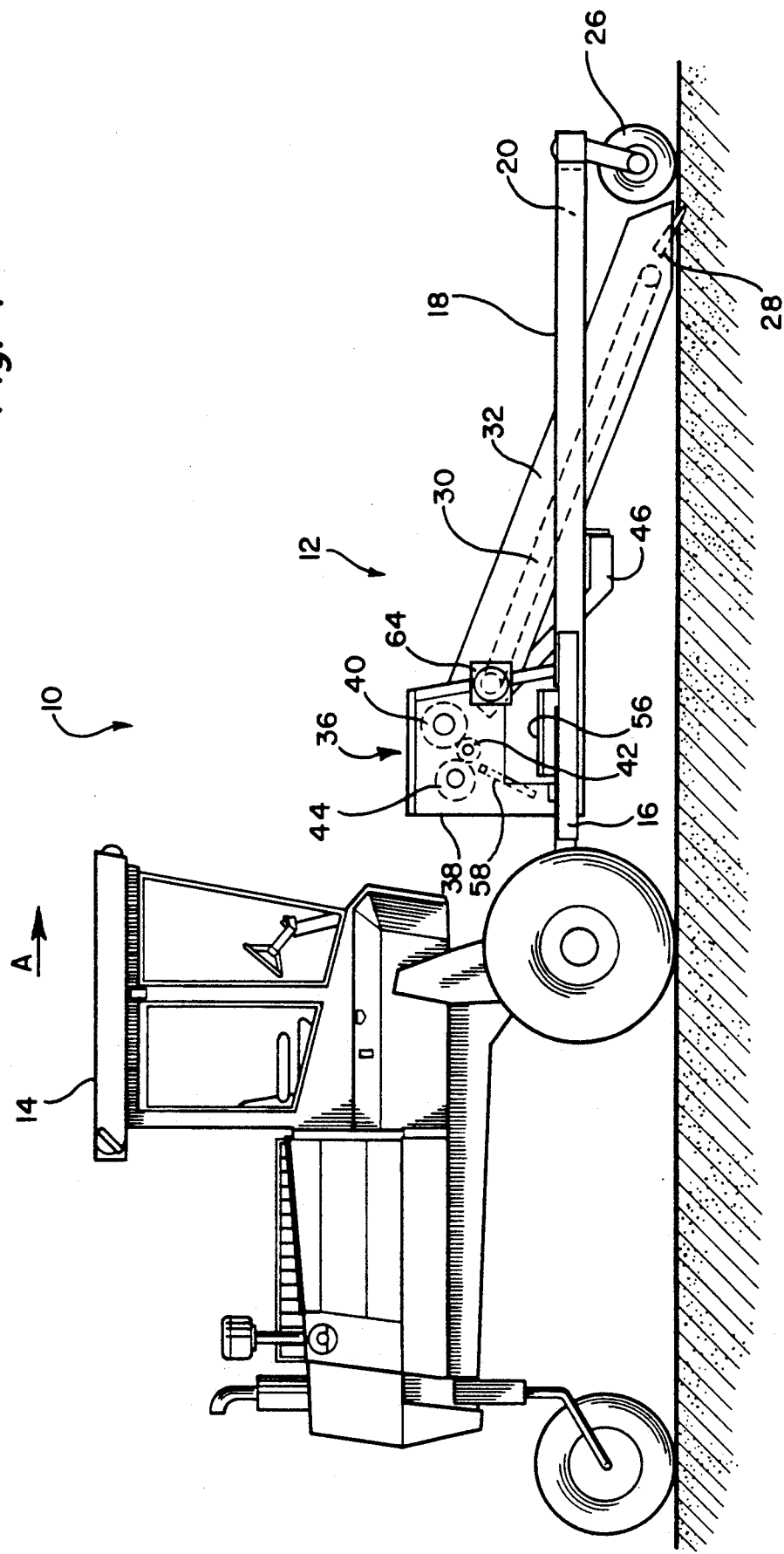
FIG. 1 is a side elevation view, in substantially schematic form, of the vine crop harvester of the present invention.

Referring initially to FIG. 1, a vine crop harvester 10 according to a preferred embodiment of the present invention is depicted. A harvesting assembly 12 is connected to a tractor 14 in a manner such that the tractor 14 may be driven in the direction of arrow A in FIG. 1 to propel the harvesting assembly through the crop field. Although the means for attaching the harvesting assembly to the tractor may take on numerous suitable forms, a pair of opposing, elongated tubing members 16, which are box-shaped in cross-section, may advantageously be welded to frame 18 of the harvesting assembly, and further attached to the chassis of the tractor 14 by suitable fastening means, preferably of a detachable type.

Tractor 14 may be of substantially any conventional design, and the tractor in and of itself does not form a part of this invention. Various desired characteristics of the tractor for use in the harvester 10, such as the size, power output and range of speeds will be readily apparent to one of ordinary skill in the art and will therefore not be discussed herein in detail.

Frame 18 of the harvesting assembly comprises a pair of channels 20, 22 extending substantially horizontally (FIG. 1) and parallel to one another (FIG. 2), as well as parallel to what will be termed an axial direction of the machine or apparatus. Channels 20, 22 are joined at a front end of the harvesting assembly to cross member 24. Caster-type wheels 26 are provided at or near the front end of the harvesting assembly, and are sized and disposed to assist in maintaining channels 20, 22 in their substantially horizontal orientation.

A digger blade 28 and digger chain 30, the constructional details and functions of which will be discussed later in the specification, are disposed between channels 20, 22 and extend across a substantial portion of the distance between the channels. A pair of blade and chain support channels 32, 34 are attached to and are disposed interiorly of channels 20, 22, respectively. As seen in FIG. 1, the blade and chain support channels 32, 34 are disposed at a shallow angle to the ground plane, and are thus positioned to hold digger chain 30 at a desired shallow angle to the ground plane as well.

A pinch roller subassembly comprises a pinch roller support frame 38 depicted in substantially schematic form in FIG. 1, which extends upwardly above channels 20, 22 and above an uppermost extent of channels 32, 34, in order to be capable of maintaining pinch rollers 40, 42, 44 in a desired position with respect to the upper end of digger chain 30.

Pinch rollers 40, 42, 44 span substantially the entire width of the digger chain 30 (FIG. 2), thereby ensuring that all vines carried up the digger chain will be introduced between the rollers to separate any cucumbers therefrom.

Also shown schematically in FIG. 1 is a blower assembly 46 attached to frame 18 which is designed to generate a cushion of air blowing upwardly into the area occupied by the pinch roller subassembly 36. The advantages provided by the blower assembly will be discussed in connection with the operation of the harvester.

Figure 2:
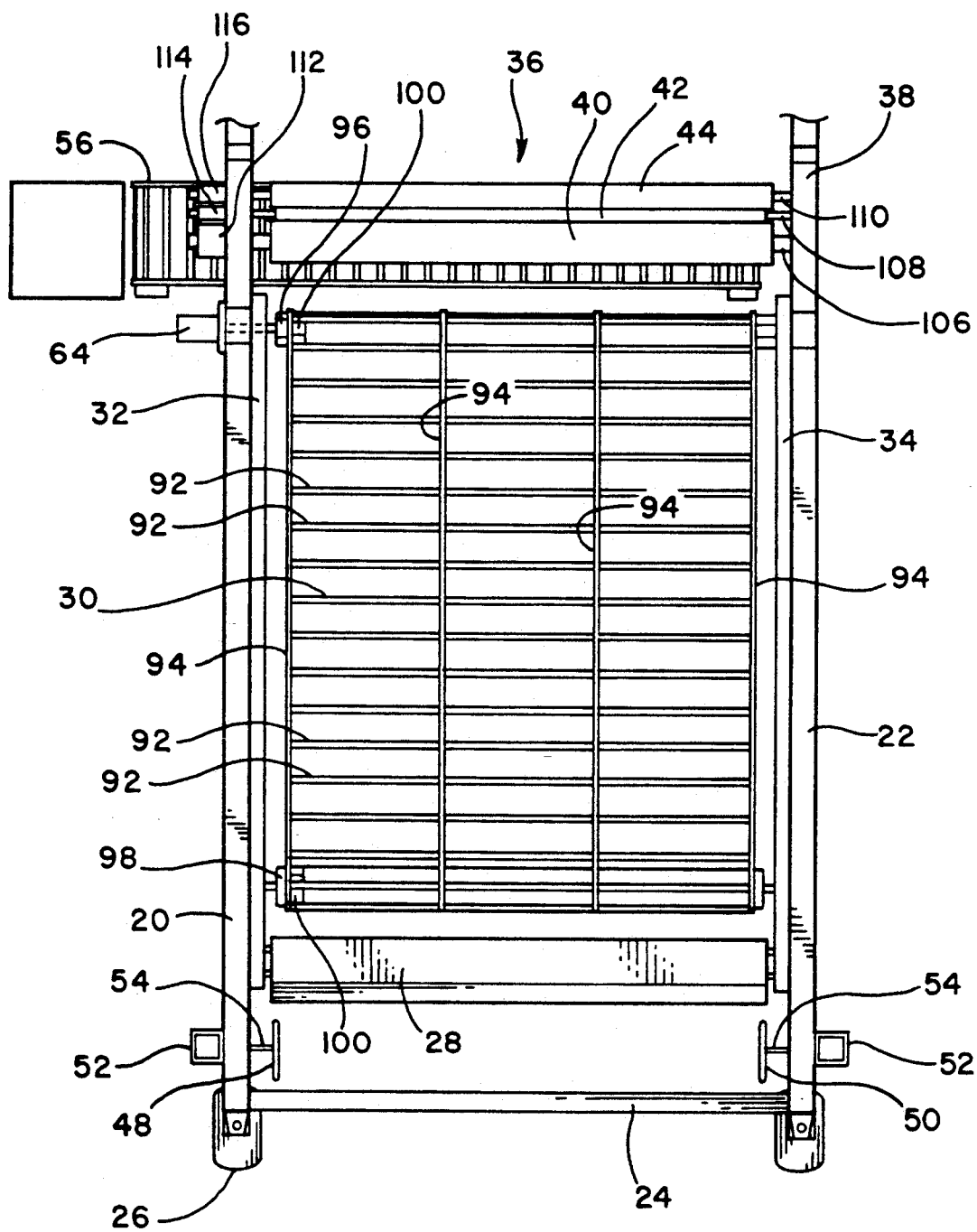
FIG. 2 is a top plan view of the harvesting assembly according to a preferred embodiment of the present invention.

Shown in FIG. 2, but omitted from FIG. 1 for the sake of clarity, are a pair of soil cutting wheels 48, 50 which are preferably attached to channels 20, 22 by vertical stanchions 52 from which axles 54 extend. Soil cutting wheels 48, 50 may preferably be vertically movable and provided with a spring biasing which urges the wheels downwardly into the soil, but which allows the wheels to raise upon encountering objects in the soil through which the wheel will not cut, such as rocks.

Also shown in FIGS. 1 and 2 is a cross chain 56 which is of the endless-belt type, and which travels in a direction transverse to the axial machine direction underneath the pinch roll assembly 36. When the harvester is in operation, the cucumbers fall onto the cross chain 56 after having been separated from the vine at the pinch roll subassembly, and the cross chain moves the cucumbers out to the side of the harvesting assembly 12 for further handling. FIG. 1 also shows, in broken lines, a back retaining wall 58 disposed at the back of the pinch roll subassembly 36, which extends vertically between the subassembly and the cross chain 56 across substantially the entire width of the pinch roll subassembly, and which is preferably secured to pinch roll frame 38 at the sides of the apparatus. The back retaining wall serves as a backstop preventing any cucumbers from missing cross chain 56 as they drop from the pinch rollers.

The basic operation of the harvester 10 will now be briefly described, after which the specific advantages and improvements provided by the harvester of the present invention will be discussed in detail. Wheels 60 of tractor 14 are the drive wheels of the harvester, and tractor 14 pushes the harvesting assembly ahead through a vine crop (VC, FIG. 4B) growing in and above soil or ground 62. As the harvester advances, the soil cutting wheels 48, 50 make cuts in the soil parallel to the axial harvesting machine direction, which facilitates the digging of the soil and lifting of the vine crop. Digger blade 28 follows closely behind soil cutting wheels 48, 50 and breaks up the soil and simultaneously cuts and lifts the vines from the broken-up soil.

A gap G (FIG. 4B) is provided between digger blade 28 and digger chain 30 to permit a large amount of the dirt, including large clods of dirt, to fall from the vine crop prior to the vine being picked up by the digger chain. As the harvester advances further, the digger chain 30 advances to meet vine crop VC. Digger chain 30 is of the endless belt-type and is driven by a hydraulic motor 64 at a top of the belt to travel in an upward direction on an upper side of the chain 30. Digger chain 30 is thus used to advance the vine to which the cucumbers are attached upwardly toward pinch roller subassembly 36. Digger chain 30 may optionally be provided with rubber fingers 31 (FIGS. 3 and 5) protruding from the surface of the chain to assist in pulling the vines up the chain to further reduce potential slippage of the vines on the chain.

Figure 5:
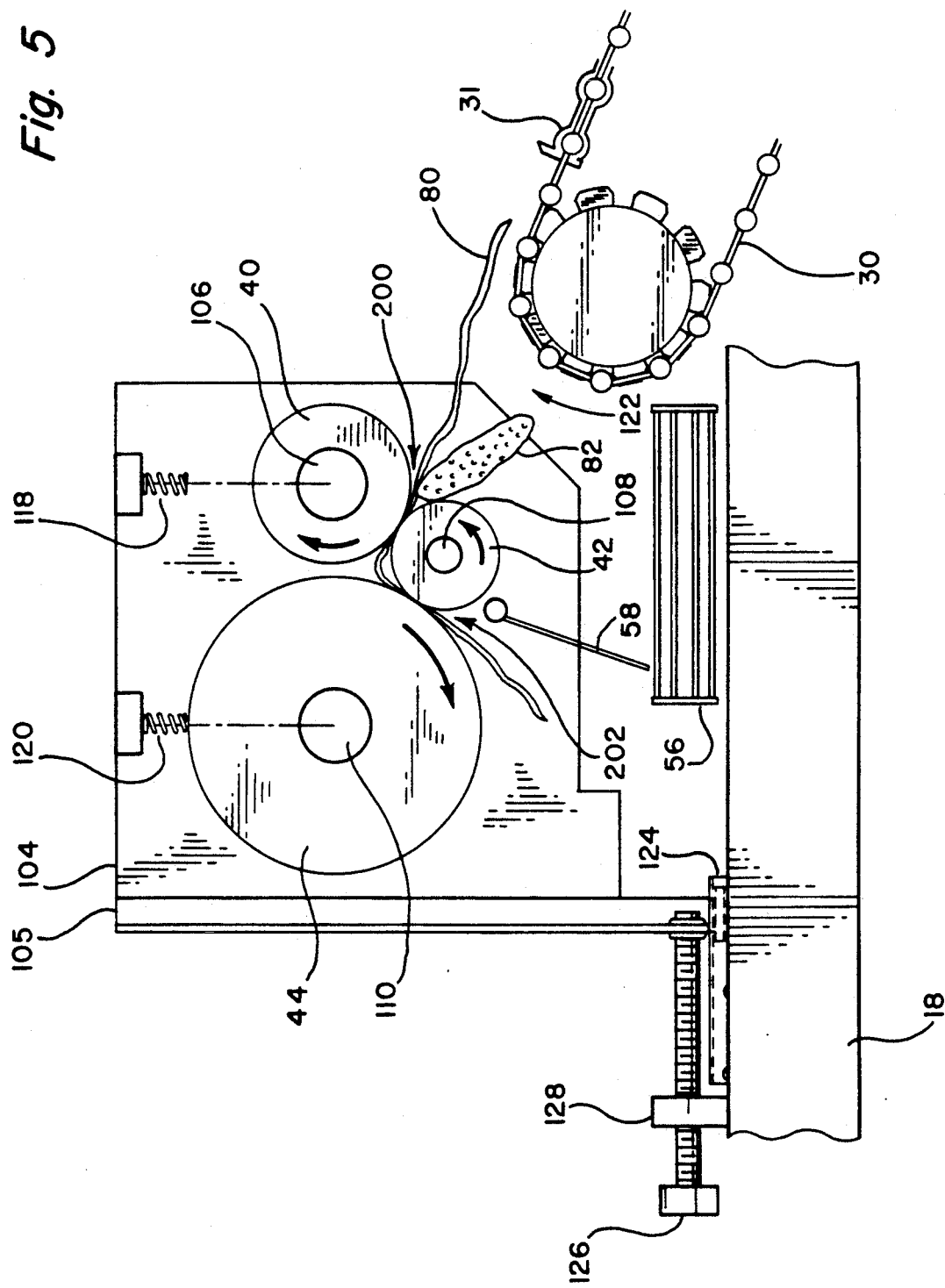
FIG. 5 is a side view of the snap or pinch roller subassembly and the upper portion of the digger chain of the harvesting assembly.

In the most general sense, the rollers 40, 42, and 44 operate in the same manner as pinch rollers previously employed in the art of cucumber harvesting, wherein pinch rollers 40 and 42 are driven in the direction indicated in FIG. 5, to draw the vine and any cucumbers attached thereto toward the nip between these pinch rollers. Roller 40 is biased into contact with roller 42, which is mounted in a fixed disposition (rotational movement only), and roller 40 is capable of deflecting upwardly through a limited range against a spring biasing force to allow the vine and any leaves, but not the cucumbers, to pass through the nip. The vine is thus pulled free of the cucumbers, which are left to drop onto cross chain 56, which moves the cucumbers transversely to the side of the harvester 10, where means are provided for further handling of the cucumbers. Backup roller 44 may be driven by a hydraulic motor or alternatively by the rotating pinch roller 42 to assist in removing the vine material from the region near the nip of pinch rollers 40, 42. The vines may be disposed of in any conventional manner, and are preferably directed away from the harvested cucumbers and back to the ground behind the advancing harvester 10.

Referring now to FIGS. 4A, 4B and 4C, the construction and operation of the digger blade 28 will be discussed. It has been determined in accordance with the development of the harvester of the present invention that the rate at which the vine crop may be harvested is slowed by resistance encountered in the soil and by the vines themselves. Accordingly, an improved digger blade construction has been developed which reduces the resistance encountered by the harvester in recovering the vine crop from the ground.

FIG. 4A shows that digger blade 28 is of a composite construction, having a base plate 70 made of a basic carbon steel or other material providing good strength at low cost. Secured at the front upper side of base plate is a cutting blade 72 preferably made of stainless steel or other highly corrosion resistant material. A Teflon (polytetrafluoroethylene or PTFE) sheet 74 is secured to the rear upper side of base plate 70. These elements may preferably be held flush against base plate 70 by anchoring the elements thereto with countersunk screws 76, allowing the upper surface 78 of the composite blade 28 to present a substantially smooth surface to the dirt and vines passing over the blade.

Sliding resistance of the soil and vines over the blade is minimized in that the cutting blade 72 is not prone to oxidation, which would roughen the upper surface of the blade presented to the soil and increase the resistance encountered, and which would have the tendency to abrade any cucumbers passing over the roughened surface. Further, the Teflon (PTFE) surface coating decreases the sliding resistance, particularly when the harvesting is performed in wet, muddy soil conditions. Other materials having a coefficient of friction comparable to that of PTFE may be employed in place of the PTFE on the digger blade of this preferred embodiment as well.

FIGS. 4B and 4C together illustrate a further advantage provided by the harvester 10 of the present invention. FIG. 4B shows the relative positions of the digger blade 28 and digger chain 30 as the harvester is advanced through soil 62 and vine crop VC, while omitting the frame structure 18 and the means for mounting these items in position, in order to better illustrate the operation of the elements. As digger blade 28 advances through the soil 62, the soil is broken up and the vines 80 are cut loose from the soil. The cut vines 80 and soil pass over the upper surface 78 of blade 28. Digger chain 30 is disposed in a spaced apart relation to the back of blade 28, in order to allow loose soil to drop and separate from the vine crop VC to be carried up the chain 30 for subsequent separation of the cucumbers 82 from the vine 80.

In this arrangement, it is generally desired to separate as much soil as practical through the gap G between digger blade 28 and digger chain 30, and it should be apparent from viewing FIG. 4B that if a large gap is provided, the loose soil will have a better opportunity to drop back to the ground. However, the smooth transition of the vine crop VC from the digger blade 28 to the digger chain is optimized when the back of the blade is very close to the digger chain 30, which would tend to dictate having a very small gap G between the blade and chain. Employing a smaller gap between the blade and chain also reduces the potential problem of losing the smaller "pickles" 83 through the gap when harvesting primarily a large cucumber crop.

Turning now to FIG. 4C, the present invention provides means for adjusting the gap G between digger blade 28 and digger chain 30, to allow the spacing to be adjusted for various soil conditions. In its simplest mechanical form, the means for adjusting the gap may comprise providing a plurality of sets of bores 84, 86, 88 in a pair of plates 33, 35 supported by frame members 32, 34 at either side of the harvester which permit bolt-through attachment of the digger blade 28 at varying distances from the digger chain. When the harvester is used in soil which primarily breaks up into larger dirt clods, the blade may be set in a position farther from the digger chain, for example, employing bores 88 shown in FIG. 4C, in order to provide a sufficient gap to allow the dirt clods to fall between the blade and chain. On the other hand, when the harvester is used in a field consisting primarily of sandy loam or sandy soil, the blade 28 may be positioned closer to the digger chain 30 such as the position depicted in FIG. 4C wherein bolts 90 are employed to effect a bolt-through connection using bores 84. The means for adjustment thus provides the ability to move the digger blade 28 as close to the digger chain 30 as soil conditions will permit.

The angle of attack of the digger blade is also preferably adjustable for varying soil conditions. In the embodiment depicted in FIG. 4C, wherein the blade is mounted in a bolt-through manner to support plates 33, 35, this may be accomplished by providing a plurality of bores disposed in an arc at the back end of support plates 33, 35, whereby the digger blade may be pivoted about the selected front bore, 84, 86 or 88, and a desired rear bore may be selected for setting the blade at the desired angle.

The two modes of adjustability of the digger blade discussed above may, of course, be accomplished by any number of adjustment means, including, for example, mounting the blade in a stationary position to supports at the sides of the harvester which themselves may be moved by hydraulic means or otherwise to set the position of the blade 28.

Digger chain 30 is similar in construction to chains used previously in the art in, for example, potato and tomato harvesters. The chain 30 comprises a plurality of parallel, spaced apart rods 92 made of steel, or possibly aluminum or other materials, extending across the width of the belt. The rods 92 are held in spaced apart relation by two or more rubber belts 94, which are formed into loops to create the endless belt configuration.

FIG. 2 shows four of these belts, although two belts disposed at the two sides of the chain is generally considered to be the preferred embodiment, as the chain tends to pick up less of the dirt which contributes to abrasion of the cucumbers. The spaces between rods 92 serve to allow smaller pieces of dirt, leaves and other miscellaneous debris to fall through the ground as the vine and cucumbers are advanced. In the harvesting assembly of the present invention, fingers 31 may advantageously be employed, which may be separate rubber components fastened to the chain adjacent areas where the rods and belts are fastened together, as best seen in FIG. 5.

The rubber belts 94 are fastened to each of the rods 92 by flattening (crimping, crushing) the rods, and riveting or bolting the rubber belts through the rods. The digger chain extends between upper roller 96 and lower roller 98, which each have sprocket wheels 100 at both ends thereof to engage and advance the rods 92 in the depicted direction to drive the chain. In the preferred embodiment, upper roller 96 is driven by hydraulic motor 64 attached to frame 38, while the lower roller 98 acts as a follower roller to guide the chain 28 at the lower end adjacent digger blade 28.

In connection with the development of the harvester 10 of the present invention, it was determined that a great deal of damage to the cucumbers occurred as a result of the slippage of the cucumbers and vines on the steep digger chains previously employed in harvesting cucumbers. As a result, the harvester of the present invention has been designed to provide a belt of extended length disposed at a much shallower angle to the ground in order to reduce the amount of slippage of the cucumbers which will occur as the chain 30 advances the cucumbers upwardly toward the pinch roller subassembly 36.

In a preferred embodiment of the invention the digger chain 30 will be disposed to form approximately a 20° angle with the surface of the ground below. Any angle shallower than 20° will tend to reduce slippage to a further extent and may be employed in accordance with the present invention, but may also cause other parts of the harvesting assembly 12 to ride too closely to the ground. The digger chain 30 may also be disposed at an angle steeper than 20°, up to, for example, about a 35° angle with the ground below, but a steepness on the order of about 45° or more should be avoided as excessive slippage and crop damage resulting therefrom will occur.

Because a certain amount of vertical clearance from the ground is required in order to fit elements such as the cross chain 56 underneath a pinch roller subassembly 38, the preferred shallow 20° angle was obtained by extending the length of the chain by about five feet over previous harvesting assembly designs. This extension provides the chain with a shallower profile without having to lower the pinch rollers or the elements disposed below the set of pinch rollers. The additional chain length also results in a much smoother and steadier flow of vines up the chain as it allows the vines to stretch out along the chain in transport.

Turning now especially to FIGS. 3 and 5, the pinch roller subassembly and blower will be discussed in further detail. The cucumber-laden vines are carried to the upper end of digger chain 30 as the chain is driven and the harvester advances through the crop field. Blower assembly 46, shown in somewhat schematical form in FIGS. 1 and 3, is used to generate a steady stream of air or an air curtain upwardly toward nip 200 between pinch rollers 40, 42. This air curtain will direct the vine departing the upper end of digger chain 28 toward the nip 200, whereupon the rollers 40, 42, being driven in the direction indicated by the arrows in FIG. 5, will grab hold of the vine 80 and draw it through the nip 200.

Once the initial grabbing of the vine takes place, the action of the rollers themselves will continue to draw the vine 80 to and through nip 200, although it has been determined in accordance with the development of the present invention that blower 46 does provide continuing assistance in advancing or throwing the vines 80 toward the rollers 40, 42. In addition, blower 46 operates to blow loose debris, such as leaves, small pieces of detached vine, and dirt clods upwardly away from cross chain 56 and the harvested cucumbers are thus delivered by cross chain or conveyor 56 for further processing with a minimum of debris.

Blower 46 preferably comprises a discharge duct 47 which extends across substantially the entire width of digger chain 28 and pinch rollers 40, 42, in order to ensure that air is blown upwardly across this entire width. In the embodiment depicted in FIG. 3, the duct 47 is coupled with a conventional centrifugal-type blower, wherein the air is discharged into duct 47 at one side thereof and is forced across the width of the duct at a lower end thereof. It will be recognized that other blower configurations may be used with the harvesting assembly 12 of the present invention as well. For example, a squirrel-cage blower, wherein the air is exhausted or delivered to duct 47 across the entire width of the duct, as opposed to being delivered at one side thereof, may be advantageously employed in this service.

Pinch rollers 40, 42 and backup roller 44 are mounted and maintained in position between a pair of pinch roller support plates 102, 104 having openings therein into which bearings (not shown) may be inserted, through which roller shafts 106, 108, 110 will extend to be coupled with hydraulic motors 112, 114, 116 (FIG. 2). Pinch roller 42 is mounted in support plates 102, 104 such that only rotational movement about shaft 108 of the roller is permitted. Pinch roller 40 and backup roller 44, are, however, mounted with means for allowing a predetermined amount of pivoting movement, such that each of these rollers may pivot out of contact with pinch roller 42 when the vine and/or leaves are passed therebetween. Shown schematically in FIG. 5 are a spring biasing means 118 for roller 40 and a spring biasing means 120 for roller 44, which urge the rollers into contact with roller 42. The pivoting movement or deflection of rollers 40, 44 will be done against the spring biasing force. This spring biasing may be accomplished in several ways which will be apparent to those of ordinary skill in the art, for example, by mounting the rollers 40, 44 to plates 102, 104 at points off-axis with shafts 106, 110 and providing a spring biasing means attached between the support plate and the mounting hardware.

The vine 80 brings cucumbers 82 up to nip 200 between rollers 40, 42, and although roller 40 is permitted to jog upwardly in a pivoting motion against the force of biasing spring 118 (shown schematically) to open a space at nip 200 to allow vine 80 to pass therebetween, the spring force and limit of travel of roller 40 will be set such that even small "pickle" cucumbers will not be permitted to pass through the nip. The rapid pulling action on the vine instead causes cucumbers 82 to be snapped free of the vine as the cucumbers come into contact with one or both of rollers 40, 42. The cucumbers will then fall down onto cross chain or conveyor 56, moving underneath in a direction transverse to the axial machine direction.

The vine 80 and any leaves attached thereto exiting nip 200 between pinch rollers 40, 42, will be pulled clear of the nip 200, in order to permit continuous harvesting, by the action of pinch roller 42 and backup roller 44. These rollers form a nip 202 through which the vine 80 and attached leaves are pulled, and the vines 80 are either directly discarded onto the ground under the advancing tractor 14, or may be directed to the side of the harvester 10 by any suitable means. Backup roller 44 is also retained in contact with roller 42 by the force of a biasing means 120, shown schematically in FIG. 5 as a spring. It can be seen in FIG. 5 that back retaining wall 58, in addition to ensuring that cucumbers 82 separated from the vine are not lost off the back of cross chain 56, may also serve as a barrier preventing vines 80 from landing on cross chain 56 and being transported with the separated cucumbers to a further point of handling.

It has been recognized in accordance with the development of the harvester of the present invention that size of the discharge throat 122, namely the distance between the upper end of the digger chain 30 and the entrance to the pinch roller assembly, (nip 200 in the FIG. 5 embodiment) has a significant effect on the efficiency with which the harvesting assembly 12 operates. Harvester designs previously have employed, in addition to a fast moving, short, steep belt for transporting the cucumbers from the ground to the separating means, a small throat. Both the high belt velocity and the small throat contribute to increased damage to the cucumbers at the separation stage of the harvesting process.

The pinch roller subassembly in the present invention has means for adjusting the size of the throat by providing means for moving the set of rollers 40, 42, 44 and the support plates disposed at the sides of the rollers relative to the frame 18 of the harvester and to the upper end of digger chain 30. Thus, when the crop being harvested comprises primarily or exclusively the smaller "pickle" cucumbers, wherein the crop is sparse and of relatively low density, the rollers may preferably be positioned close to the end of the digger chain, in a position providing a small throat, such as has been previously employed in prior harvesters. However, when the crop being harvested is primarily or exclusively "long greens" i.e., larger cucumbers, the rollers may be moved further away from the end of the digger chain 30, to provide a large throat, giving the denser vines and larger cucumbers sufficient space to be separated and dropped in a smooth operation.

In the depicted preferred embodiment of FIG. 5, the means for moving the set of rollers comprises a channel 124 which is attached to frame 18 and holds therein a lower portion of an angle-iron strut 105 which is attached to and reinforces pinch roller support plate 104, permitting the strut and support plate to slide toward and away from digger chain 30. The position of support plate 104 may be controlled by any suitable means, an example of which is shown a threaded bolt 126 extending through nut 128, which is welded or otherwise secured to frame 18. Bolt 126 is secured to angle iron strut 105 in a manner allowing plate 104 to advance and retract with bolt 126, thereby allowing the set of rollers to be positioned as desired. A matching roller moving or positioning means will also preferably be provided for support plate 102 at the other side of the harvesting assembly as well.

The separated cucumbers, either long greens or pickles, are transported transversely to the axial harvesting direction, and are preferably transferred to further handling equipment at the side of the harvester. In one preferred embodiment, a boom conveyor assembly 300 (FIG. 6) may be attached to the side frame of the harvesting assembly. Boom conveyor 300 has a receiving bed 302 disposed below the end of cross chain or conveyor 56 to receive the cucumbers as they drop from the cross chain. A lower end of an upwardly angled chute 304 is disposed adjacent to bed 302, and at an upper end, the chute 304 is connected to a horizontally disposed discharge platform 306.

An elevator chain 308 of an endless belt-type construction is driven to engage cucumbers in the receiving bed 302 and to carry the cucumbers up angled chute 304 and across discharge platform 306, where the cucumbers are dropped from a final time into a truck 310 or other moving piece of equipment having a large bin or hopper 312 for receiving the cucumbers. In this embodiment, the truck 310 is preferably driven alongside the harvester 10 at substantially the same rate of speed, so as to maintain the bin or other receptacle disposed beneath discharge platform 306 at all times. The elevator chain 308 may preferably have fingers 314, with which to lift the cucumbers, extending across a width of belt 308 and spaced evenly apart at a desired distance around the entire belt. The use of the depicted boom conveyor assembly will also improve the yield of undamaged harvested product over harvesters used in the prior art in that the number of "drops" of the cucumbers are reduced in this relatively simple handler.

Figure 6:
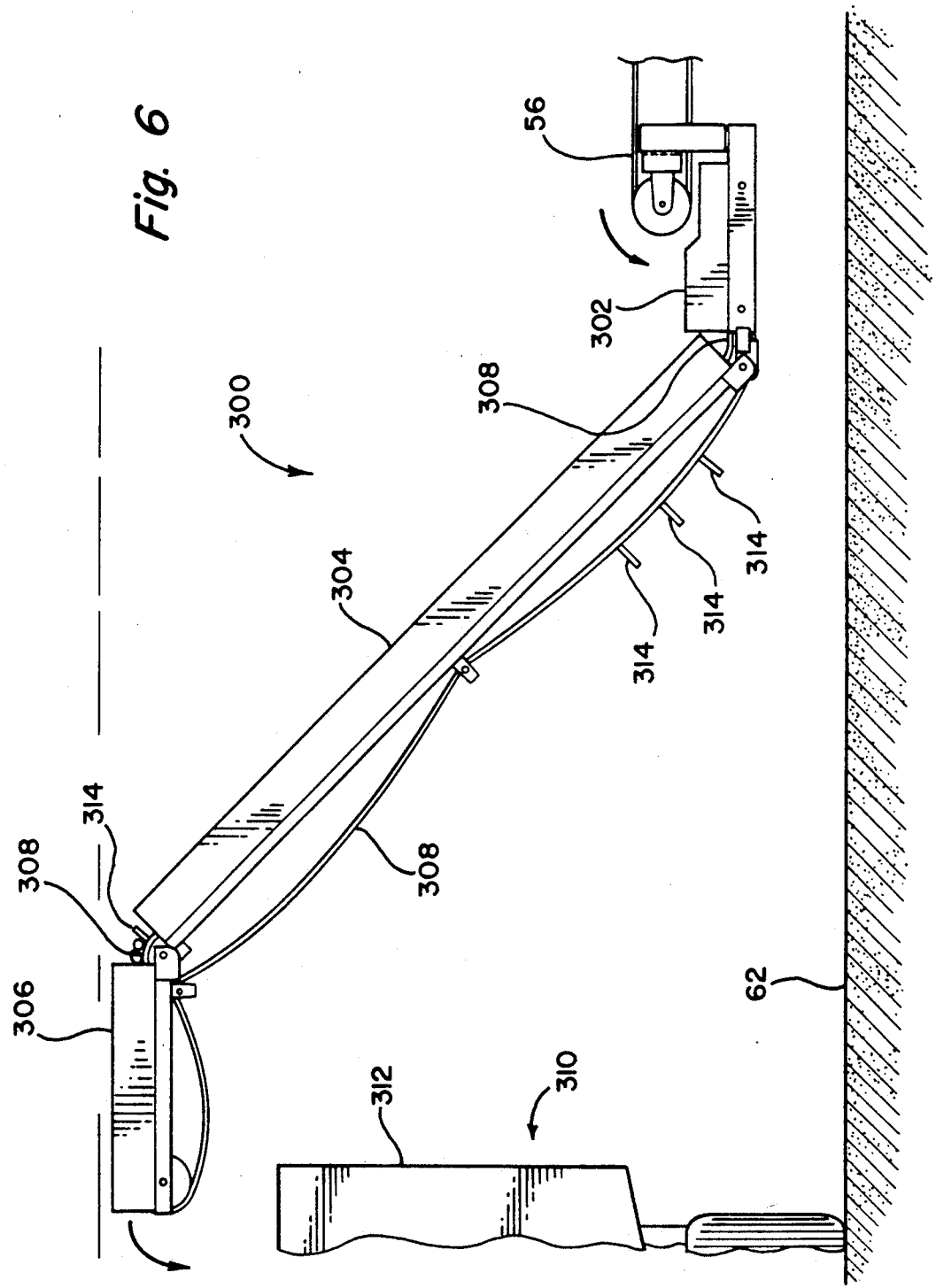
FIG. 6 is a front elevation view of a boom conveyor assembly in accordance with a preferred embodiment of the present invention.

It should be recognized that the means for further handling of the cucumbers illustrated in FIG. 6 is only one of many assemblies which may be employed to complete the cucumber harvesting operation, and other means will be readily adapted for use with the harvesting assembly, of the present invention. The lifting belt 308 may advantageously be driven by a hydraulic motor (not shown) in a manner similar to that used to drive digger chain 30 and cross chain or conveyor 56.

A hydraulic control system is employed in the harvester 10 of the present invention. The system uses a hydraulic pump (not shown) of substantially conventional design at the power take off (PTO) of the tractor. The propulsion of the tractor 14, including the powering of the wheels and thus the steering, may be controlled by the hydraulic system. In addition, the hydraulic motors operatively coupled to the hydraulic pump and used to drive the digger chain 30, cross conveyor 56, lifting belt 308, and rollers 40, 42, 44, may be used to control the speed of those elements independently of one another, and independently of the tractor propulsion as well.

An important advantage provided by such a control system is that the operating speed of the harvesting assembly components may be controlled to account for changes in the density of the crop being harvested while the tractor 14 advances the harvesting assembly at a substantially constant ground speed.

In addition, because the speed of the rollers and the speeds of the various belts are independently controllable, the operating speeds may be adjusted to assist in reducing damage to the crop, depending on the particular crop conditions.

For example, when harvesting long greens (larger cucumbers) the control of the flow of vines is an important factor in minimizing damage to the cucumbers. The speed of the rollers and digger chain may thus advantageously be decreased, while the speeds of the cross chain or conveyor 56 and the elevator chain 308 may be either decreased or increased as necessary to accommodate the volume of long greens being separated from the vines and discharged.

Figure 7:
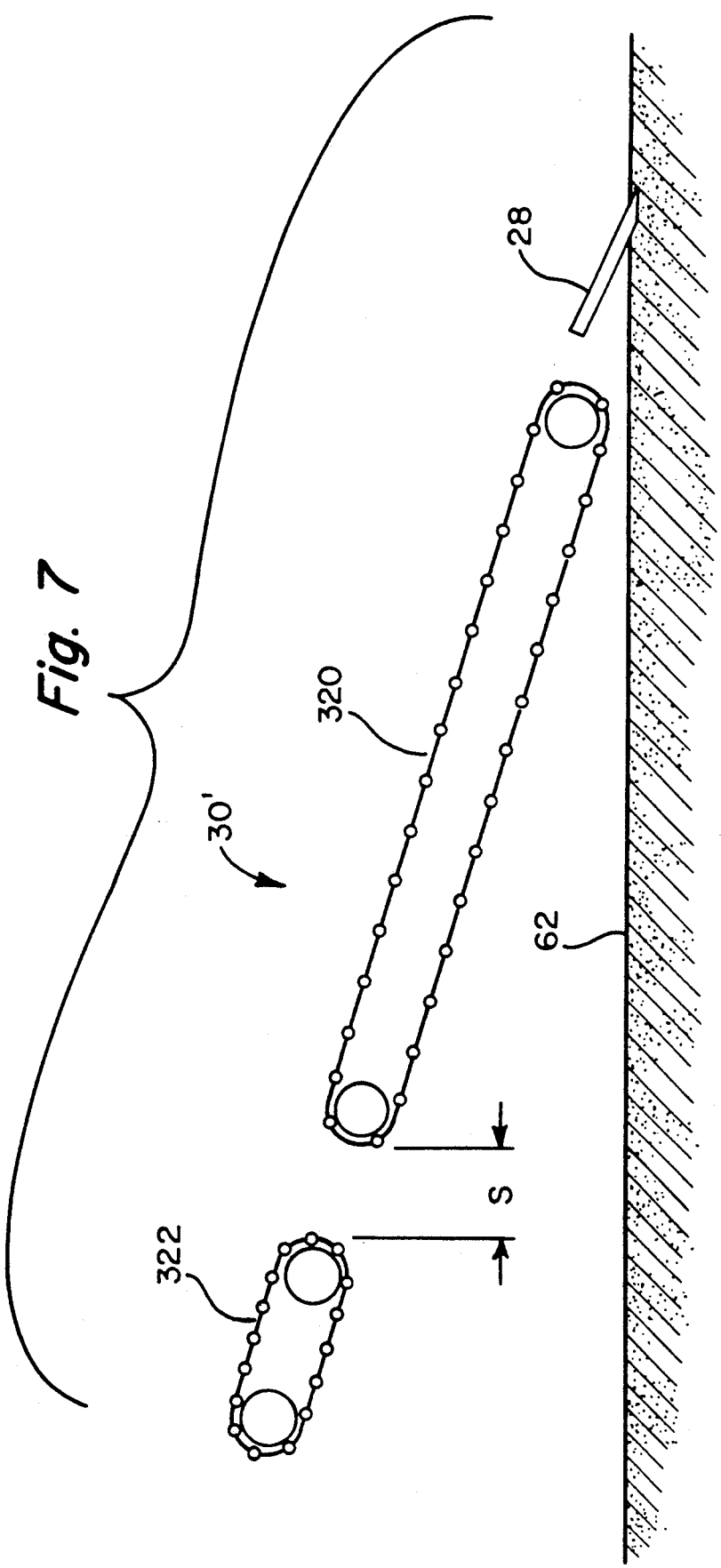
FIG. 7 is a schematic side view of an alternative preferred embodiment of the digger chain of the present invention.

FIG. 7 depicts, in substantially schematic form, an alternative embodiment of digger chain 30' of the present invention The digger chain 30' is a split chain having a longer lower chain 320 (approximately 5 ft.) and an shorter upper chain 322 (approximately 2¼ ft.). An advantage provided by using a split digger chain 30' is that damage to long greens may be further reduced, in that the harvesting operation may be performed with the lower chain purposefully carrying a substantial amount of dirt upon which the cucumbers will ride, thereby preventing the cucumbers would thus be almost completely avoided. At the split, a horizontal spacing S is provided, the dimension of which is preferably adjustable, between about 2-6 inches, for example, to allow the dirt carried up lower chain 320 to fall back to the ground prior to the vines and cucumbers reaching the pinch roller assembly. The lower and upper chains 320, 322 may be coupled such that they will be driven by the same hydraulic motor, or alternatively the chains 320, 322 may be driven by separate motors. Each of the chains may be of a similar construction to digger chain 30 previously described.

While the harvester of the present invention has been described above with respect to a preferred embodiment, it will be recognized by those skilled in the art that variations and modifications may be made without departing from the spirit and scope of the present invention. The scope of the present invention is therefore to be determined by reference to the appended claims.

We claim:

1. A vine crop harvest comprising:
   a harvesting assembly;
   means for propelling said harvesting assembly along a ground surface in an axial machine direction;
   wherein said harvesting assembly further comprises:
   a frame having connected thereto an elongated digger chain of an endless belt type, said elongated differ chain being disposed on said frame at a shallow angle to said ground, said frame further having connected thereto a digger blade at a lower end of said digger chain, a cutting edge of said digger blade being disposed beneath said ground surface when said harvesting assembly is in use;
   a pinch roller subassembly disposed in an orientation transverse to said axial machine direction, and proximate to an upper end of said digger chain, comprising a first and a second pinch roller, and a first backup roller, said first pinch roller and said first backup roller being biased into contact with said second pinch roller, and being so constructed and arranged to be pivotable away from said second pinch roller against said biasing;
   means for transporting vines of said vine crop upwardly on said digger chain and for introducing said vines into a nip defined between said first and said second pinch rollers, and
   wherein said elongated differ chain forms an angle of less than about 35° with said ground surface.

2. A vine crop harvester as defined in claim 1 wherein said harvesting assembly further comprises means for blowing air upwardly toward said pinch roller subassembly, said air blowing means comprising a duct means for discharging air across substantially an entire width of said pinch roller subassembly.

3. A vine crop harvester as defined in claim 1 wherein said digger chain comprises a plurality of transversely extending rods secured together in a substantially parallel spaced apart relation by a plurality of rubber belts said belts being formed into endless loops and fastened to each of said rods near at least a first and a second end of each rod.

4. A vine crop harvester as defined in claim 3 wherein said digger chain is provided with a plurality of rubber fingers attached to and extending outwardly from said chain.

5. A vine crop harvester as defined in claim 1 wherein said digger chain comprises an upper ad a lower chain spaced apart at a predetermined distance.

6. A vine crop harvester as defined in claim 5 wherein each of said upper chain and lower chains comprises a plurality of transversely extending rods secured together in a substantially parallel spaced apart relation by a plurality of rubber belts said belts being formed into endless loops and fastened to said rods of said upper and said lower chains near at least a first and a second end of each rod.

7. A vine crop harvester as defined in claim 5 further comprising means for adjusting a spacing between a lower end of said upper chain and an upper end of said lower chain.

8. A vine crop harvester as defined in claim 6 further comprising means for adjusting a spacing between a lower end of said upper chain and an upper end of said lower chain.

9. A vine crop harvester as defined in claim 1 wherein said elongated differ chain forms an angle of about 20° with said ground surface.

10. A vine crop harvester comprising: a harvesting assembly;
 means for propelling said harvesting assembly along a ground surface in an axial machine direction;
 wherein said harvesting assembly further comprises:
 a frame having connected thereto an elongated digger chain of an endless belt type, said elongated digger chain being disposed on said frame at a shallow angle to said ground, said frame further having connected thereto a digger blade at a lower end of said digger chain, a cutting edge of said digger blade being disposed beneath said ground surface when said harvesting assembly is in use;
 a pinch roller subassembly disposed in an orientation transverse to said axial machine direction, and proximate to an upper end of said digger chain, comprising a first and a second pinch roller, and a first backup roller, said first pinch roller and said first backup roller being biased into contact with said second pinch roller, and being so constructed and arranged to be pivotable away from said second pinch roller against said biased;
 means for transporting vines of said vine crop upwardly on said digger chain and for introducing said vines into a nip defined between said first and said second pinch rollers; and
 means for adjusting a width of a throat, said throat being defined by a spacing between an upper end of said digger chain and said first and second pinch rollers.

11. A vine crop harvester as defined in claim 10 wherein said throat adjusting means is so constructed and arranged to permit said spacing to be adjusted to a distance greater than a length of said vine crop products being harvested.

12. A vine crop harvester as defined in claim 11 wherein said pinch roller subassembly further comprises a first and a second support plate disposed at either side of said first and second pinch rollers and said first backup roller, said support plates having openings through which a shaft of each of said rollers extends, each of said rollers being maintained in position by said support plates.

13. A vine crop harvester as defined in claim 12 wherein said throat adjusting means comprises means for moving said first and second support plates carrying said rollers along said frame of said harvesting assembly toward and away from said upper end of said digger chain.

14. A vine crop harvester comprising: a harvesting assembly;
 means for propelling said harvesting assembly along a ground surface in an axial machine direction;
 wherein said harvesting assembly further comprises:
 a frame having connected thereto an elongated digger chain of an endless belt type, said elongated digger chain being disposed on said frame at a shallow angle to said ground, said frame further having connected thereto a digger blade at a lower end of said digger chain, a cutting edge of said digger blade being disposed beneath said ground surface when said harvesting assembly is in use;
 a pinch roller subassembly disposed in an orientation transverse to said axial machine direction, and proximate to an upper end to said digger chain, comprising a first and a second pinch roller, and a first backup roller, said first pinch roller and said first backup roller being biased into contact with said second pinch roller, and being so constructed and arranged to be pivotable away from said second pinch roller against said biasing;
 means for transporting vines of said vine crop upwardly on said digger chain and for introducing said vines into a nip defined between said first and said second pinch rollers; and
 means for changing a distance between said lower end of said digger chain and said digger blade.

15. A vine crop harvester as defined in claim 14 a further comprising means for changing an angle formed by said digger blade with said ground surface.

16. A vine crop harvester comprising: a harvesting assembly;
 means for propelling said harvesting assembly along a ground surface in an axial machine direction;
 wherein said harvesting assembly further comprises:
 a frame having connected thereto an elongated digger chain of an endless belt type, said elongated digger chain being disposed on said frame at a shallow angle to said ground, said frame further having connected thereto a digger blade at a lower end of said digger chain, a cutting edge of said digger blade being disposed beneath said ground surface when said harvesting assembly is in use;
 a pinch roller subassembly disposed in an orientation transverse to said axial machine direction, and proximate to an upper end of said digger chain, comprising a first and a second pinch roller, and a first backup roller, said first pinch roller and said first backup roller being biased into contact with said second pinch roller, and being so constructed and arranged to be pivotable away from said second pinch roller against said biasing;
 means for transporting vines of said vine crop upwardly on said digger chain and for introducing said vines into a nip defined between said first and said second pinch rollers; and
 wherein said digger blade comprises a base plate having a corrosion resistant cutting blade secured to an front upper side of said base plate.

17. A vine crop harvester as defined in claim 16 wherein said base plate of said digger blade further has a layer of material disposed on a rear upper side thereof, said layer of material having a low coefficient of friction.

18. A vine crop harvester as defined in claim 16 wherein said corrosion-resistant cutting blade is made of stainless steel.

19. A vine crop harvester as defined in claim 17 wherein said layer of material disposed on said rear upper side of said base plate is a polytetrafluoroethylene material.

20. A vine crop harvester as defined in claim 1 further comprising a cross conveyor of an endless belt type, said cross conveyor being disposed underneath said nip between said first and second rollers to receive a crop after said crop has been separated from said vine at said nip, said cross conveyor being movable in a direction to deliver said crop to a predetermined side of said harvesting assembly.

21. A vine crop harvester as defined in claim 20 further comprising means for independently controlling a speed of said digger chain, a speed of said cross conveyor, and a rotational speed of said rollers.

22. A vine crop harvester as defined in claim 21 wherein said independent controlling means further comprises means for controlling a traveling speed of said harvesting assembly propelling means independently of said speed of said digger chain, said cross conveyor, and said rollers.

23. A vine crop harvester as defined in claim 20 further comprising a boom conveyor assembly having a receiving bed disposed below an exit end of said cross conveyor, an upwardly extending chute means for depositing said crop in a crop collection means separate from said harvester, and an elevator chain of an endless belt construction, wherein said chute means extends transversely to said axial machine direction, and wherein said chute means extends upwardly to a vertical height sufficient to deposit said crop in a predetermined crop collection means.

24. A vine crop harvester comprising:
a harvesting assembly;
means for propelling said harvesting assembly along a ground surface in an axial machine direction;
wherein said harvesting assembly further comprises:
a frame having connected thereto an elongated digger chain of an endless belt type, said elongated digger chain being disposed on said frame at a shallow angle to said ground, said frame further having connected thereto a digger blade at a lower end of said digger chain, a cutting edge of said digger blade being disposed beneath said ground surface when said harvesting assembly is in use;
a pinch roller subassembly disposed in an orientation transverse to said axial machine direction, and proximate to an upper end of said digger chain, comprising a first and a second pinch roller, and a first backup roller, said first pinch roller and said first backup roller being biased into contact with said second pinch roller, and being so constructed and arranged to be pivotable away from said second pinch roller against said biasing;
means for transporting vines of said vine crop upwardly on said digger chain and for introducing said vines into a nip defined between said first and said second pinch rollers,
a cross conveyor of an endless belt type, said cross conveyor being disposed underneath said nip between said first and second rollers to receive a crop after said crop has been separated from said vine at said nip, said cross conveyor being movable in a direction to deliver said crop to a predetermined side of said harvesting assembly, and wherein said harvesting assembly further comprises means for blowing air upwardly toward said pinch roller subassembly and upwardly through at least a portion of said cross conveyor, said air blowing means comprising duct means for discharging air across substantially an entire width of said pinch roller assembly.

* * * * *

UNITED STATES PATENT AND TRADEMARK OFFICE
CERTIFICATE OF CORRECTION

PATENT NO. : 5,077,963

DATED : January 7, 1992

INVENTOR(S) : E. James Harrison, et al

It is certified that error appears in the above-identified patent and that said Letters Patent is hereby corrected as shown below:

Col. 12, line 11, (Claim 1, line1), "harvest" should be -- harvester --.

Col. 12, line 18, (Claim 1, line 8), "differ" should be -- digger --.

Col. 12, line 37, (Claim 1, line 27), "differ" should be -- digger --.

Col. 13, line 31, (Claim 10, line 22), "biased" should be -- biasing --.

Signed and Sealed this

Fifteenth Day of June, 1993

Attest:

MICHAEL K. KIRK

Attesting Officer

Acting Commissioner of Patents and Trademarks